(12) United States Patent
Miyamoto

(10) Patent No.: US 8,128,497 B2
(45) Date of Patent: Mar. 6, 2012

(54) GAME MACHINE, GAME MACHINE CONTROL METHOD, INFORMATION RECORDING MEDIUM, AND PROGRAM

(75) Inventor: Toshiyuki Miyamoto, Tokyo (JP)

(73) Assignee: Konami Digital Entertainment Co., Ltd., Minato-ku, Tokyo (JP)

( * ) Notice: Subject to any disclaimer, the term of this patent is extended or adjusted under 35 U.S.C. 154(b) by 1370 days.

(21) Appl. No.: 11/575,650

(22) PCT Filed: Sep. 12, 2005

(86) PCT No.: PCT/JP2005/016778
§ 371 (c)(1),
(2), (4) Date: Mar. 20, 2007

(87) PCT Pub. No.: WO2006/033260
PCT Pub. Date: Mar. 30, 2006

(65) Prior Publication Data
US 2007/0218993 A1    Sep. 20, 2007

(30) Foreign Application Priority Data
Sep. 22, 2004    (JP) .................................. 2004-275720

(51) Int. Cl.
*A63F 9/24*    (2006.01)
*G06F 17/00*    (2006.01)

(52) U.S. Cl. ........... 463/35; 340/384.7; 463/33; 463/49; 381/17; 381/104; 704/258

(58) Field of Classification Search ........................ None
See application file for complete search history.

(56) References Cited

U.S. PATENT DOCUMENTS
3,831,172 A * 8/1974 Olliges et al. .............. 340/384.7
(Continued)

FOREIGN PATENT DOCUMENTS
EP    1 182 643    2/2002
(Continued)

OTHER PUBLICATIONS
International Search Report and Written Opinion PCT/JP2005/016778 dated Dec. 13, 2005, 5 pages.
(Continued)

*Primary Examiner* — Paul A. D'Agostino
(74) *Attorney, Agent, or Firm* — Howard & Howard Attorneys PLLC

(57) ABSTRACT

To output sounds generated by multiple objects disposed in a virtual space in as easy a manner as possible while giving live feelings, a storage unit (202) of a game machine (201) stores information on objects of a first type and a second type which move in the virtual space. A basic sound acquiring unit (203) acquires basic sound information corresponding to the total number of the objects. An imitation sound acquiring unit (204) acquires imitation sound information imitating a sound generated by an object of the first type from its position in the virtual space. A mixing output unit (205) mixes and outputs the basic sound information and the imitation sound information. An input receiving unit (206) receives an instruction input from the user. In a case where the instruction input satisfies a predetermined extinction condition, a deleting unit (207) deletes any of objects of the first type from the storage unit (202) if there is no object of the second type stored in the storage unit (202), and deletes any of objects of the second type from the storage unit (202) if there is.

7 Claims, 3 Drawing Sheets

U.S. PATENT DOCUMENTS

| | | | | |
|---|---|---|---|---|
| 4,174,836 | A * | 11/1979 | Kearney | 463/49 |
| 5,026,051 | A * | 6/1991 | Lowe et al. | 463/35 |
| 5,768,393 | A * | 6/1998 | Mukojima et al. | 381/17 |
| 5,832,431 | A * | 11/1998 | Severson et al. | 704/258 |
| 5,862,229 | A * | 1/1999 | Shimizu | 381/17 |
| 5,993,318 | A * | 11/1999 | Kousaki | 463/35 |
| 6,154,549 | A * | 11/2000 | Arnold et al. | 381/104 |
| 6,199,030 | B1 * | 3/2001 | Stone | 703/8 |
| 6,328,651 | B1 * | 12/2001 | Lebensfeld et al. | 463/52 |
| 6,379,249 | B1 * | 4/2002 | Satsukawa et al. | 463/31 |
| 6,638,168 | B1 * | 10/2003 | Rehkemper | 463/35 |
| 6,760,050 | B1 * | 7/2004 | Nakagawa | 715/848 |
| 6,857,960 | B2 * | 2/2005 | Okubo et al. | 463/35 |
| 6,918,829 | B2 * | 7/2005 | Ikariko | 463/5 |
| 7,085,387 | B1 * | 8/2006 | Metcalf | 381/26 |
| 7,203,327 | B2 * | 4/2007 | Kubota | 381/310 |
| 7,305,097 | B2 * | 12/2007 | Rosen et al. | 381/307 |
| 7,828,657 | B2 * | 11/2010 | Booth | 463/35 |
| 2001/0014621 | A1 * | 8/2001 | Okubo et al. | 463/35 |
| 2001/0023202 | A1 * | 9/2001 | Okubo | 463/35 |
| 2001/0029203 | A1 * | 10/2001 | Shoji et al. | 463/33 |
| 2002/0034307 | A1 * | 3/2002 | Kubota | 381/17 |
| 2003/0032478 | A1 * | 2/2003 | Takahama et al. | 463/30 |
| 2003/0199325 | A1 * | 10/2003 | Wang | 463/51 |
| 2004/0029625 | A1 * | 2/2004 | Annunziata | 463/1 |
| 2004/0110561 | A1 * | 6/2004 | Kawamura | 463/35 |
| 2004/0111171 | A1 * | 6/2004 | Jang et al. | 700/94 |

FOREIGN PATENT DOCUMENTS

| | | |
|---|---|---|
| JP | 2000-116956 | 4/2000 |
| JP | 2000 267675 | 9/2000 |
| JP | 2002-051399 | 2/2002 |
| JP | 3455739 | 7/2003 |
| JP | 2004-258765 | 9/2004 |

OTHER PUBLICATIONS

Herder, "Optimization of Sound Spatialization Resource Management through Clustering," The Journal of Three Dimensional Images, vol. 13, No. 3, Sep. 1999, pp. 59-63.

Tsingos et al., "Breaking the 64 Spatialized Sources Barrier", www.gamasutra.com, [online] May 29, 2003, XP002453151 Retrieved from the Internet: URL: http://www.gamasutra.com/resource_guide/20030528/tsingos_pfv.htm> [retrieved on Sep. 28, 2007],pp. 1-4; figure 10.

Tsingos et al., "Perceptual Audio Rendering of Complex Virtual Environments", ACM Transactions on Graphics ACM USA, vol. 23, No. 3, Aug. 2004, pp. 249-258, XP002453152 ISSN: 0730-0301,sections 5.1-6.1, the whole document.

Supplementary European Search Report for Application No. 05778494.4, PCT/JP2005016778, dated Oct. 18, 2007, 7 pages total.

* cited by examiner

GAME MACHINE, GAME MACHINE CONTROL METHOD, INFORMATION RECORDING MEDIUM, AND PROGRAM

TECHNICAL FIELD

The present invention relates to a game machine and a game machine control method which are suitable for outputting sounds generated by multiple objects placed in a virtual space in as easy a manner as possible, a program for realizing these on a computer, and a computer-readable information recording medium storing the program.

BACKGROUND ART

Conventionally, game machines, which embody, for example, shooting games, match-up combats, etc., output sounds when the ego character controlled by the player, any targets, other characters, etc. make an appearance or do some acts, from the speaker to which the game machine is connected, in order to increase the live feelings of the player and targets.

A technique for such sound output by a game machine is disclosed in the document indicated below.
Patent Literature 1: Japanese Patent No. 3455739

Other than the above, games today can output sounds by stereo reproduction or surround reproduction, etc., and an increasing number of games reproduce BGM or output sound effects for various objects (ego character, enemy character, other characters, targets of various kinds, etc.) that generate sounds.

Furthermore, by localizing a sound generator in a virtual two-dimensional space or a virtual three-dimensional space, it has become possible to make a sound effect of an object be heard from the direction in which the object exists.

In this case, sound information of the sound generated by each object is appropriately attenuated or phase-delayed in consideration of the positional information of the object, and after this, subjected to mixing to be output as the sound.

DISCLOSURE OF INVENTION

Problem to be Solved by the Invention

However, in a case where there exist many objects to be considered, it might become virtually impossible to carry out the above-described process due to the limit on the amount of calculations. Hence, there has been a strong demand for a method, which increases the live feelings by sounds in an easy manner, without increasing the amount of calculations even in a case where the number of objects is large.

The present invention was made to solve the above-described problem, and an object of the present invention is to provide a game machine and a game machine control method which are suitable for outputting sounds generated by multiple objects placed in a virtual space in as easy a manner as possible while giving live feelings, a program for realizing these on a computer, and a computer-readable information recording medium storing the program.

Means for Solving the Problem

To achieve the above object, the following invention will be disclosed according to the principle of the present invention.

A game machine according to a first aspect of the present invention comprises a storage unit, a basic sound acquiring unit, an imitation sound acquiring unit, a mixing output unit, an input receiving unit, and a deleting unit, which are configured as follows.

First, the storage unit stores an object of a first type or a second type, which moves in a virtual space, in association with a type thereof and a position thereof in the virtual space.

Each object of the present invention corresponds to, for example, an enemy character, an obstacle of various types, etc. For example, considering a bit swarm of bees as enemy characters, each object corresponds to "a group comprising a plurality of bees", and the big swarm comprises "a plurality of groups". And objects of the first type and objects of the second type are different in whether or not they are the objective of consideration as a sound source, as will be described later.

Typically, the number of the objects of the first type is smaller than the number of the objects of the second type, and may be one to several objects. The number of the objects of the first type can arbitrarily be determined according to the computational capacity of the game machine.

Meanwhile, the basic sound acquiring unit acquires basic sound information, which is associated with a total umber of objects of the first type and the second type which are stored in the storage unit.

In a case where a big swarm of bees is expressed by the present invention as in the above-described example, the basic sound information to be generated here corresponds to the booming sound of the entire big swarm of bees. Accordingly, the sound volume of the booming sound is changed according to the number of groups constituting the bit swarm of bees (the number being approximately proportional to the number of bees). The basic sound information functions as a basic environmental sound of the enemy character.

Further, the imitation sound acquiring unit acquires imitation sound information imitating a sound generated by an object of the first type stored in the storage unit, from its associated position in the virtual space.

In the case of the above-described example, regarding a group of bees corresponding to an object of the first type, where in the virtual space this group is positioned is considered. Then, based on the relative positional relationship between the present position and the position of the object, the sound volume of the sound information of the booming sound is changed, the phase is changed, and various delaying processes are performed in order to configure the imitation sound information such that the booming sound of this group of bees is heard from the position of this group.

Then, the mixing output unit mixes and outputs the acquired basic sound information and the acquired imitation sound information.

Since the basic sound information is a sound corresponding to the total number of the objects as described above, it helps give live feelings due to the size of the big swarm of bees. Since the imitation sound information is a sound corresponding to a change of the position of some of the objects, it helps give live feelings as if the swarm of bees is moving.

Meanwhile, the input receiving unit receives an instruction input from a user.

In the game machine, instruction inputs of various types from the user are received through a controller. Conceivable as such instruction inputs are various designations for the configuration of the game itself, displacement of the ego character, attacks on the enemy character, etc.

Further, in a case where the received instruction input satisfies a predetermined extinction condition, the deleing unit deletes any of the objects of the first type from the storage unit if there is no object of the second type stored in the storage unit, and deletes any of the objects of the second type from the storage unit if there is any object of the second type stored in the storage unit.

For example, in a case where an attack (for example, flame throwing toward the big swarm of bees) is made on the enemy character and this attack reaches any group of bees, it is possible to consider that the extinction condition is satisfied. According to the present invention, when an attack on any enemy character is successful, an enemy character of an object of the second type is beaten earlier, so that the objects of the first type may be reduced by as few as possible. This makes it possible not to lose the live feelings according to the changes of the positions of the objects, as much as possible.

As apparent from this, according to the present invention, by outputting sounds corresponding to the number and movements of multiple objects disposed in the virtual space in an easy manner, it becomes possible to give live feelings while suppressing the amount of calculations necessary for this process as much as possible.

Further, in the game machine of the present invention, the basic sound acquiring unit may be configured to acquire the basic sound information in a manner that a sound volume of the basic sound information monotonically non-decreases when the total number of the objects of the first type and the second type stored in the storage unit increases, and the sound volume monotonically non-increases when the total number decreases.

This invention is according to a preferred embodiment of the above-described invention, and the sound volume of the basic sound information is increased if the total number of enemy characters increases and the sound volume is reduced if the total number reduces.

According to this invention, the player can know the number of objects from an increase or a decrease of the sound volume of the basic sound information, and the amount of required calculations can be suppressed and live feelings can be given to the player.

The game machine according to the present invention further comprises a display unit, which may be configured as follows.

That is, the display unit displays states of the objects of the first type and the second type stored in the storage unit, and a sight which moves in the virtual space in accordance with the received instruction input.

According to this invention, as in the above-described example, a case that the enemy characters are attacked in accordance with an instruction input of the player is assumed. In addition to the objects corresponding to the enemy characters, the sight for attacks is displayed on the screen. The objects are displayed with the use of three-dimensional graphics techniques such as transparent transformation, etc. in a case where the objects are disposed in a virtual three-dimensional space, and with the use of two-dimensional graphics techniques such as expansion/reduction, parallel translation, rotation, etc. in a case where the objects are disposed in a virtual two-dimensional space.

Meanwhile, in deleting any of the objects of the first type, the deleting unit deletes an object of the first type that is displayed closest to the sight, and in deleting any of the objects of the second type, the deleting unit deletes an object of the second type that is displayed closest to the sight.

It is typical to first determine whether or not to delete any object and then delete the object that is closest to the sight. However, "the predetermined extinction condition" may be variously changed. For example, if a condition that "there is any object of the second type left and the sight is overlaid on an object of the second type" or that "there are only objects of the first type left and the sight is overlaid on an object of the first type", etc. is adopted, an object that is displayed closest to the sight is necessarily deleted.

This invention makes it possible to apply the above-described invention to shooting games and action games of various types.

Further, in the game machine according to the present invention, in deleting any of the objects of the second type, if there is any such object of the first type (hereinafter referred to as "object B") that is displayed closer to the sight than is an object of the second type (hereinafter referred to as "object A") which is displayed closest to the sight, and that is positioned closest to the object A of all that are in the virtual space, the deleting unit deletes the object B from the storage unit instead of deleting the object A, and updates the storage unit such that the type of the object A is to be the first type, thereby deleting the any of the objects of the second type.

In a case where the predetermined extinction condition is satisfied when the object B of the first type and the object A of the second type are both displayed near the sight, the object A of the second type is always deleted according to the above-described invention. However, according to this invention, it is taken into consideration which of the object B of the first type and the object A of the second type is displayed closer to the sight.

Then, in a case where the object B of the first type is closer to the sight than the object A of the second type is, "after the types of the object A and object B are exchanged, the object B of the second type is deleted".

According to this invention, while giving a natural impression to the player by extinguishing an object that is closer to the sight, it is possible to give an impression that the objects are moving to the player in a natural manner, by doing the most not to reduce the number of the objects of the first type.

A game machine control method according to another aspect of the present invention controls a game machine comprising a storage unit, a basic sound acquiring unit, an imitation sound acquiring unit, a mixing output unit, an input receiving unit, and a deleting unit, and comprises a basic sound acquiring step, an imitation sound acquiring step, a mixing outputting step, an input receiving step, and a deleting step, which are configured as follows.

Note that the storage unit stores an object of a first type or a second type, which moves in a virtual space, in association with a type thereof and a position thereof in the virtual space.

First, at the basic sound acquiring step, the basic sound acquiring unit acquires basic sound information, which is associated with a total number of objects of the first type and the second type, which are stored in the storage unit.

Further, at the imitation sound acquiring step, the imitation sound acquiring unit acquires imitation sound information imitating a sound generated by an object of the first type stored in the storage unit, from its associated position in the virtual space.

Then, at the mixing outputting step, the mixing output unit mixes and outputs the acquired basic sound information and the acquired imitation sound information.

Meanwhile, at the input receiving step, the input receiving unit receives an instruction input from a user.

Further, at the deleting step, in a case where the received instruction input satisfies a predetermined extinction condition, the deleting unit deletes any of the objects of the first type from the storage unit if there is no object of the second type stored in the storage unit, and deletes any of the objects of the second type from the storage unit if there is any object of the second type stored in the storage unit.

A program according to another aspect of the present invention is configured to control a computer to function as the above-described game machine, or to control a computer to perform the above-described game machine control method.

The program according to the present invention can be stored on a computer-readable information recording medium such as a compact disk, a flexible disk, a hard disk, a magneto optical disk, a digital video disk, a magnetic tape, a semiconductor memory, etc.

The above-described program can be distributed and sold via a computer communication network, independently from a computer on which the program is executed. Further, the above-described information recording medium can be distributed and sold independently from the computer.

EFFECT OF THE INVENTION

According to the present invention, it is possible to provide a game machine and a game machine control method which are suitable for outputting sounds generated by multiple objects placed in a virtual space in as easy a manner as possible while giving live feelings, a program for realizing these on a computer, and a computer-readable information recording medium storing the program.

Figure 1:
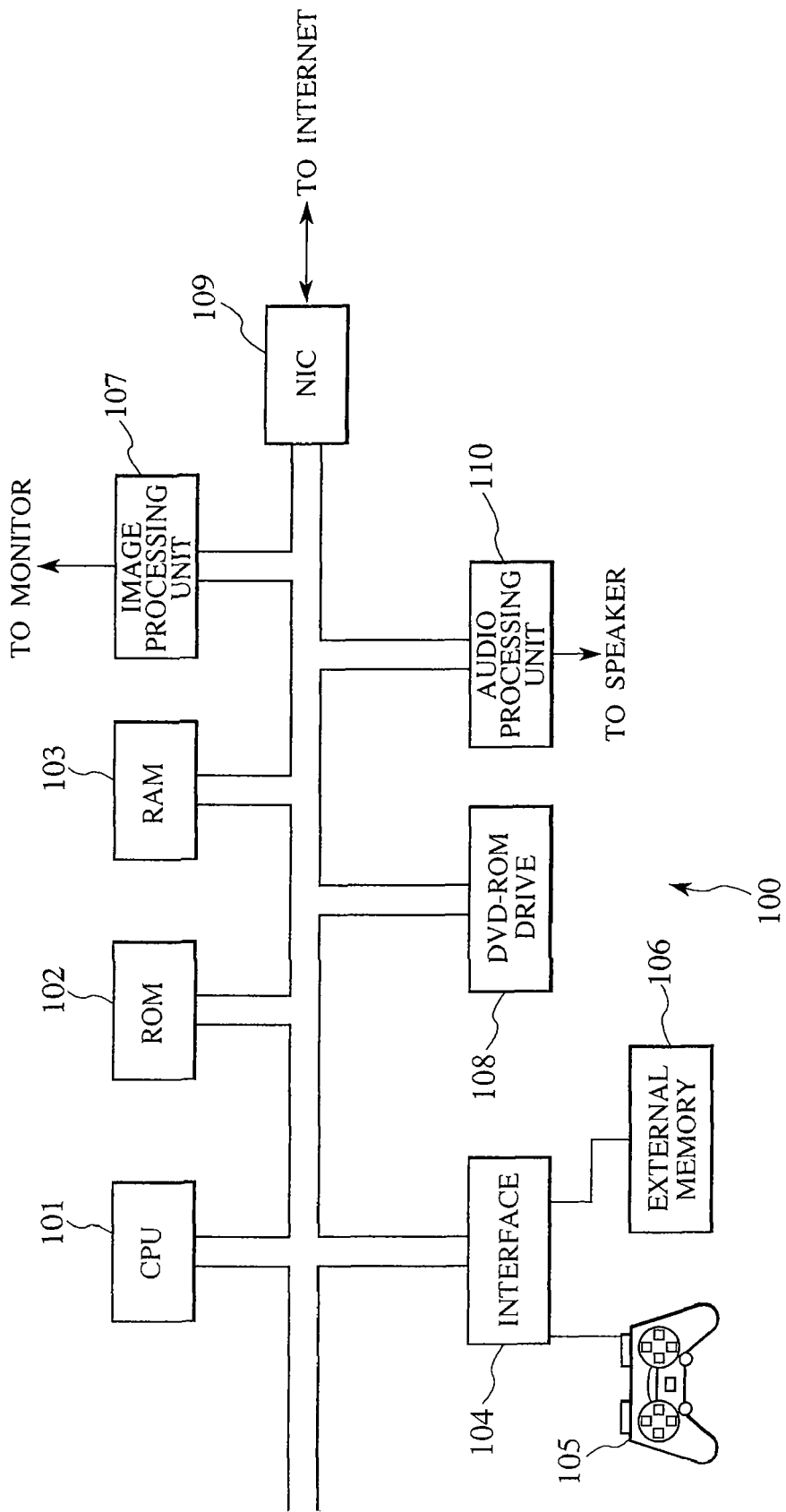
FIG. 1 It is an explanatory diagram showing a schematic structure of a typical information processing apparatus on which a game machine according to one of the embodiments of the present invention will be realized.

100 information processing apparatus
101 CPU
102 ROM
103 RAM
104 interface
105 controller
106 external memory
107 image processing unit
108 DVD-ROM drive
109 NIC
110 audio processing unit
201 game machine
202 storage unit
203 basic sound acquiring unit
204 imitation sound acquiring unit
205 mixing output unit
206 input receiving unit
207 deleting unit
208 display unit

BEST MODE FOR CARRYING OUT THE INVENTION

The embodiments of the present invention will be explained below. Embodiment in which the present invention is applied to a game machine on which three-dimensional graphics are displayed will be explained below in order to facilitate understanding. However, the present invention can likewise be applied to information processing apparatuses such as computers of various types, PDAs (Personal Data Assistants), portable telephones, etc. That is, the embodiments to be explained below are intended for explanation, not to limit the scope of the present invention. Accordingly, though those having ordinary skill in the art could employ embodiments in which each element or all the elements of the present embodiments are replaced with equivalents of those, such embodiments will also be included in the scope of the present invention.

Embodiment 1

FIG. 1 is an explanatory diagram showing a schematic structure of a typical information processing apparatus on which a game machine according to the present invention will be realized. The following explanation will be given with reference to this diagram.

An information processing apparatus 100 comprises a CPU (Central Processing Unit) 101, a ROM 102, a RAM 103, an interface 104, a controller 105, an external memory 106, an image processing unit 107, a DVD-ROM drive 108, an NIC (Network Interface Card) 109, and an audio processing unit 110.

By loading a DVD-ROM storing a game program and data onto the DVD-ROM drive 108 and turning on the power of the information processing apparatus 100, the program will be executed and the game machine according to the present embodiment will be realized.

The CPU 101 controls the operation of the entire information processing apparatus 100, and is connected to each element to exchange control signals and data. Further, by using an ALU (Arithmetic Logic Unit) (unillustrated), the CPU 101 can perform arithmetic operations such as addition, subtraction, multiplication, division, etc., logical operations such as logical addition, logical multiplication, logical negation, etc., bit operations such as bit addition, bit multiplication, bit inversion, bit shift, bit rotation, etc. upon a storage area, or a register (unillustrated), which can be accessed at a high speed. Further, the CPU 101 itself may be designed to be able to rapidly perform saturate operations such as addition, subtraction, multiplication, division, etc. for dealing with multimedia processes, vector operations such as trigonometric function, etc. or may realize these with a coprocessor.

The ROM 102 stores an IPL (Initial Program Loader) to be executed immediately after the power is turned on, execution of which triggers the program stored on the DVD-ROM to be read into the RAM 103 and executed by the CPU 101. Further, the ROM 102 stores a program and various data for an operating system necessary for controlling the operation of the entire information processing apparatus 100.

The RAM 103 is for temporarily storing data and programs, and retains the program and data read out from the DVD-ROM, and other data necessary for game proceedings and chat communications. Further, the CPU 101 performs processes such as securing a variable area in the RAM 103 to work the ALU directly upon the value stored in the variable to perform operations, or once storing the value stored in the RAM 103 in the register, performing operations upon the register, and writing back the operation result to the memory, etc.

The controller 105 connected through the interface 104 receives an operation input given by the user when playing a game such as a shooting game, etc.

The external memory 106 detachably connected through the interface 104 rewritably stores data indicating the play status (past achievements, etc.) of a shooting game, etc., data indicating the progress status of the game, data of chat communication logs (records), etc. The user can store these data on the external memory 106 where needed, by inputting instructions through the controller 105.

The DVD-ROM to be loaded on the DVD-ROM drive 108 stores a program for realizing a game and image data and audio data accompanying the game. Under the control of the CPU 101, the DVD-ROM drive 108 performs a reading process on the DVD-ROM loaded thereon to read out a necessary program and data, which are to be temporarily stored on the RAM 103, etc.

The image processing unit 107 processes the data read out from the DVD-ROM by means of the CPU 101 and an image calculation processor (unillustrated) provided in the image processing unit 107, and thereafter stores the data in a frame memory (unillustrated) provided in the image processing unit 107. The image information stored in the frame memory is converted into a video signal at a predetermined synchronization timing and output to a monitor (unillustrated) connected to the image processing unit 107. Thereby, image displays of various types are available.

The image calculation processor can rapidly perform transparent operations such as overlay operation or α blending of two-dimensional images, and saturate operations of various types.

Further, the image calculation processor can also rapidly perform an operation for rendering, by a Z buffer method, polygon information placed in a virtual three-dimensional space and having various texture information added, to obtain a rendered image of the polygon placed in the virtual three-dimensional space as seen from a predetermined view position along a predetermined direction of sight line.

Further, by the CPU 101 and the image calculation processor working in cooperation, a character string as a two-dimensional image can be depicted on the frame memory, or depicted on the surface of each polygon, according to font information defining the shape of the characters.

Further, it is general that the image calculation processor has a rendering function of projecting a bitmap image (texture image) of a triangle or a quadrangle by appropriately deforming it into an area defining another triangle or quadrangle.

The NIC 109 is for connecting the information processing apparatus 100 to a computer communication network (unillustrated) such as the Internet, etc., and comprises a 10BASE-T/100BASE-T product used for building a LAN (Local Area Network), an analog modem, an ISDN (Integrated Services Digital Network) modem, or an ADSL (Asymmetric Digital Subscriber Line) modem for connecting to the Internet by using a telephone line, a cable modem for connecting to the Internet by using a cable television line, or the like, and an interface (unillustrated) for intermediating between these and the CPU 101.

The audio processing unit 110 converts audio data read out from the DVD-ROM into an analog audio signal, and outputs the signal from a speaker (unillustrated) connected thereto. Further, under the control of the CPU 101, the audio processing unit 110 generates sound effects and music data to be sounded in the course of the game, and outputs the sounds corresponding to the data from the speaker.

In a case where the audio data recorded on the DVD-ROM is MIDI data, the audio processing unit 110 refers to the music source data included in the data, and converts the MIDI data into PCM data. Further, in a case where the audio data is compressed audio data of ADPCM format, Ogg Vorbis format, etc., the audio processing unit 110 expands the data and converts it into PCM data. By D/A (Digital/Analog) converting the PCM data at a timing corresponding to the sampling frequency of the data and outputting the data to the speaker, it is possible to output the PCM data as audios.

Aside from the above, the information processing apparatus 100 may be configured to perform the same functions as the ROM 102, the RAM 103, the external memory 106, the DVD-ROM to be loaded on the DVD-ROM drive 108, etc. by using a large-capacity external storage device such as a hard disk, etc.

A general computer comprises a CPU, a RAM, a ROM, a DVD-ROM drive, and an NIC likewise the above-described information processing apparatus 100, comprises an image processing unit having simpler functions than those of the information processing apparatus 100, and comprises a hard disk as an external storage device, and also can use a flexible disk, a magneto optical disk, a magnetic tape, etc. Further, a general computer uses not a controller, but a keyboard and a mouse as the input device.

Figure 2:
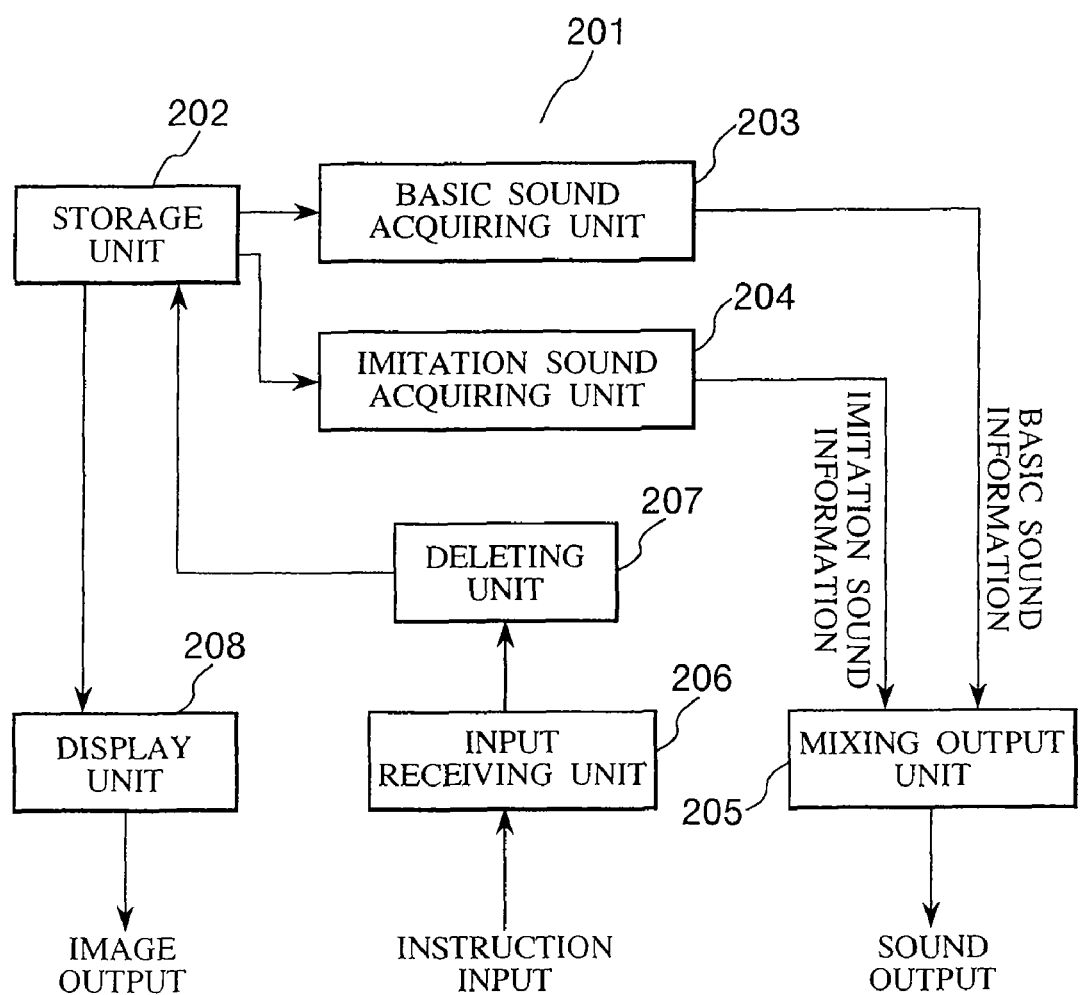
FIG. 2 It is an exemplary diagram showing a schematic structure of a game machine according to one of the embodiments of the present invention.

FIG. 2 is an exemplary diagram showing a schematic structure of a game machine according to one embodiment of the present invention. The following explanation will be given with reference to this diagram.

In the following explanation, a game machine for a game in which a big swarm of bees are burned away with a flame thrower will be explained as an example. However, cases where the invention is applied to game machines of various other types are also included in the scope of the present invention.

The game machine 201 according to the present embodiment comprises a storage unit 202, a basic sound acquiring unit 203, an imitation sound acquiring unit 204, a mixing output unit 205, an input receiving unit 206, a deleting unit 207, and a display unit 208.

Here, the storage unit 202 stores an object of a first type or of a second type, which moves in a virtual space, in association with the type thereof and the position thereof in the virtual space.

An object of the first type and an object of the second type according to the present embodiment both correspond to "a small swarm (group) of a plurality of bees". Accordingly, by a plurality of such groups being allocated in a virtual three-dimensional space, "a big swarm of bees", as an enemy character, is expressed.

This group object has its each bee expressed by a model made up of a plurality of polygons, and can be allocated in the virtual three-dimensional space with a plurality of such bees disposed apart from each other.

Depending on the rule of the game, simply, a mist-like object may be prepared. For example, this may be such a case that a room full of smoke is brightened up by vacuuming the smoke with a vacuum cleaner. In this case, an appropriate α value is set as the color of the object and α synthesis is performed to express the smoke.

As will be described later, an object of the first type and an object of the second type have different priority orders in being extinguished when attacked by the player. When an attack is successful, an object of the second type is the earlier to be deleted.

Accordingly, depending on the rule of the game, it is possible to predetermine the order of all the enemy-character objects in being deleted each time an attack is successful and to see several objects, which are the last in this order, as the objects of the first type.

According to the present embodiment, the number of objects of the first type at the earliest stage after the game is started is several (two to five) objects, and the number of objects of the second type is several tens to several hundreds. It is general to set the number of objects of the first type to be by far smaller than the number of objects of the second type. The number of objects of the first type may appropriately be set according to the computational capacity of the game machine 201 for audio processing, etc.

The type of each object and the position in the virtual space are stored in the storage unit 202. Accordingly, the RAM 103 or the like functions as the storage unit 202.

Other than this, the positional information of a sight used in the game (information indicating the position of the flame thrower, i.e., the position of the ego character and the direction in which it throws flame) is also stored in the RAM 103 or the like.

Figure 3:
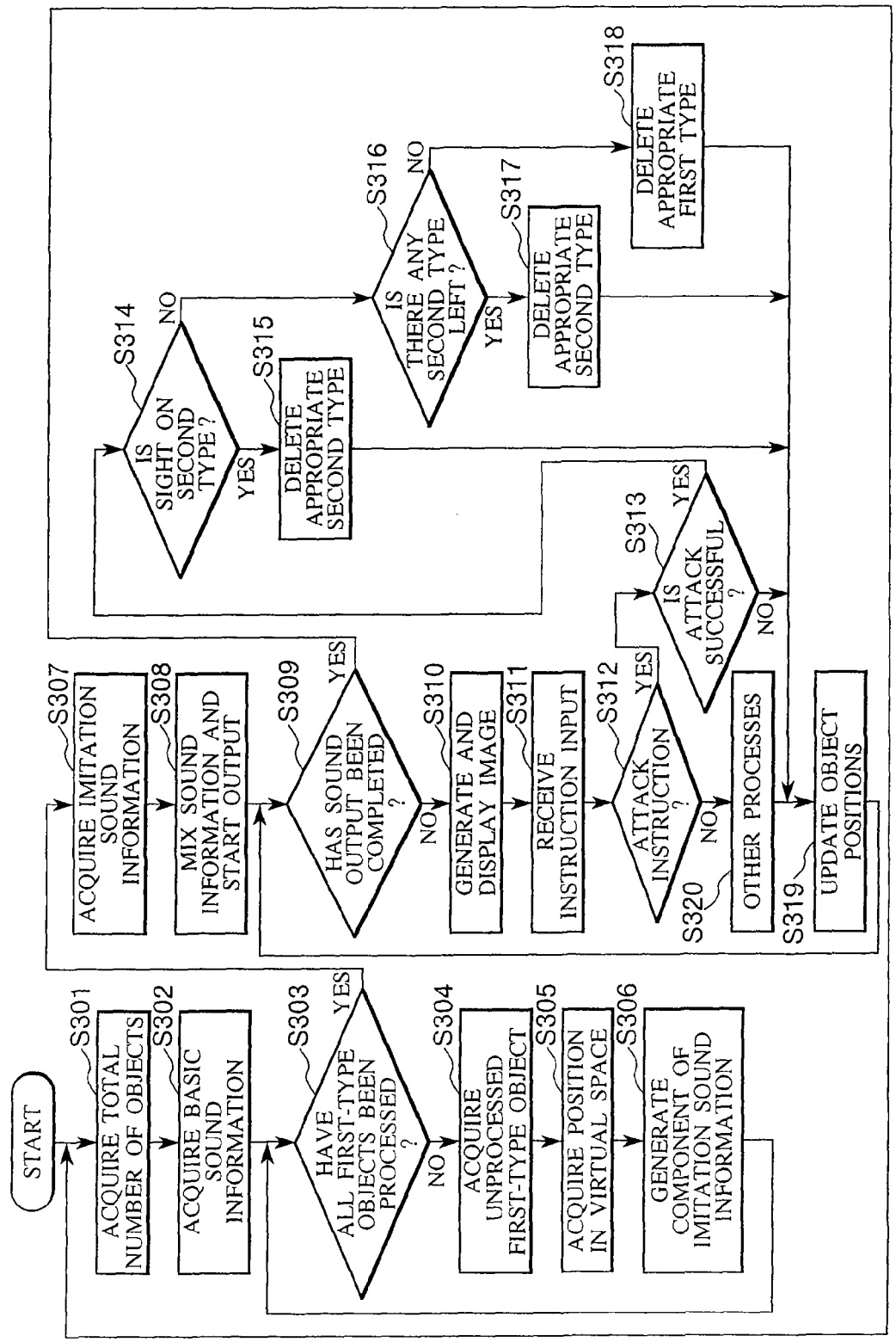
FIG. 3 It is a flowchart showing the flow of control of a control process performed by the game machine according to one of the embodiments of the present invention.

FIG. 3 is a flowchart showing the flow of control of a control process performed by the game machine according to the present embodiment. The following explanation will be given with reference to this diagram.

When the present control process is started, first, the basic sound acquiring unit 203 acquires the total number of the objects of the first type and second type which are stored in the storage unit 202 (step S301). By doing so, it is possible to know what size "the big swarm of bees" is.

Next, the basic sound acquiring unit 203 acquires basic sound information associated with the acquired total number (step S302). In the present embodiment, the basic sound information acquired here is sound information of "the booming sound of the big swarm of bees" prepared in advance, whose sound volume is changed according to the total number acquired.

Typically, the basic sound information is acquired by the sound volume of the sound information being set to "a value obtained by multiplying the acquired total number by a predetermined proportional constant". Other than this, the total number to be acquired and the sound volume may be associated with each other stepwise.

It is possible to acquire also the positional information of each object when acquiring the total number of objects of the first type and second type at step S301 to calculate "the average" of the positions of these objects, so that "the proportional constant mentioned above" may be changed according to the distance between the ego character and the "average" position in the virtual space. This makes it possible to reduce the sound volume in a case where "the big swarm of bees" is far away and to increase the sound volume in a case where the swarm is near.

The basic sound information is typically sound information (environmental sounds) having no directivity. However, in a case where "the average" of the positions is calculated as described above, it is possible to assign some components of the sound information as being generated from a sound source localized at the "average" position and assign the rest of the components as environmental sounds, and use the sum of them.

Hence, the CPU 101 functions as the basic sound acquiring unit 203, by reading out the source sound information from the DVD-ROM or a hard disk if necessary, in cooperation with the RAM 103 and an audio processing processor provided in the audio processing unit 110.

Next, the imitation sound acquiring unit 204 checks whether the processes of steps S304 to step S306 have been performed for all of the objects of the first type stored in the storage unit 202 (step S303). In a case where there is any first-type object that has not been processed (step S303; No), the imitation sound acquiring unit 204 acquires the first-type object that has not been processed (step S304), reads out the position of this first-type object in the virtual space from the storage unit 202 (step S305), generates a part of the components of imitation sound information by localizing the sound information as if the sound were generated from this first-type object disposed at that position (step S306), and returns to step S303.

In order to change the original sound information of a given sound as if the sound is generated from a first-type object disposed in a virtual space, it is necessary to take the following parameters into consideration.

The positional relationship and distance between the ego character and the first-type object.

The facing direction of the ego character.

Whether there is any obstacle around that reflects the sound.

Though having said this, since the object of the present embodiment is to express "a big swarm of bees" in an easy manner, reflection by obstacles will not be considered but the positional relationship and distance will only be considered. Thus, the sound volume is set to be smaller as the distance is longer, while set to be larger as the distance is shorter.

Other than this, the positional relationship and the facing direction of the ego character are taken into consideration according to whether the sound environment used by the player is a monaural reproduction environment, a stereo reproduction environment, or a surround reproduction environment. In the case of a stereo reproduction environment or an environment of a higher level, effects of time delay, phase shift, and sound volume change are given to the component of each channel, so that the sound can be heard from an intended direction. For such sound information processing, it is possible to use various known techniques for sound field simulation.

Then, in a case where the processes of step S304 to step S306 have been performed for all the first-type objects (step S303; Yes), the imitation sound acquiring unit 204 calculates the total sum of the components generated at step S306 and obtains this as the imitation sound information (step S307).

Hence, the CPU 101 functions as the imitation sound acquiring unit 204, by reading out the source sound information from the DVD-ROM or a hard disk if necessary, in cooperation with the RAM 103 and the audio processing processor provided in the audio processing unit 110.

Then, the mixing output unit 205 issues an instruction to the audio processing unit 110 to mix and output the acquired basic sound information and the acquired imitation sound information (step S308). As the basic sound information and the imitation sound information have a certain length, the sound will be reproduced for a certain period of time after the reproduction is started at step S308. Hence, the CPU 101 functions as the mixing output unit 205 in cooperation with the audio processing unit 110.

The following process is performed during this "certain period of time". Specifically, the processes of step S310 to step S320 will be repeated unless the instructed output of the sound information is completed (step S309; No), more accurately, until there comes "the time, which is prior to the time at which the completion of the output of the sound information is planned, by a period of time required for steps S301 to step S308".

First, the display unit 208 generates an image based on the positional information of the objects and positional information of the sight stored in the RAM 103, and displays the image showing the positional relationship between these on a display device or the like (step S310). The sight and objects are displayed with the use of three-dimensional graphics techniques such as transparent transformation, etc. in a case where the objects are disposed in a virtual three-dimensional space, and with the use of two-dimensional graphics techniques such as expansion/reduction, parallel translation, rotation, etc. in a case where the objects are disposed in a virtual two-dimensional space.

Hence, the CPU 101 functions as the display unit 208, in cooperation with the RAM 103 and the image processing unit 107.

In a case where a virtual three-dimensional space is adopted as the virtual space, the position (flame thrower) of the ego character is the position of the viewpoint, and the direction of the flame thrower is the direction of the sight line. Accordingly, if a three-dimensional graphics technique utilizing transparent transformation is employed, the sight is always positioned at the center of the screen.

Then, the input receiving unit 206 receives an instruction input from the user (step S311).

In the game machine 201, instruction inputs of various types from the user are received through the controller 105. Conceivable as such instruction inputs are various designations for the configuration of the game itself, displacement of the ego character, attacks on the enemy character, etc.

In a case where the instruction input is for instructing an attack (step S312; Yes), it is checked whether there is any object that is displayed upon the sight, based on the information regarding the position of the sight and information regarding the position of each object, which are stored in the RAM 103 (step S313).

In a case where there is any (step S313; Yes), the attack is successful. Then, it is checked whether there is any object of the second type, among the objects that are displayed upon the sight (step S314).

In a case where there is any (step S314; Yes), the deleting unit 207 deletes the object that is the closest to the position of the ego character, among the objects of the second type that are displayed upon the sight, from the storage unit 202 (step S315), and proceeds to step S319.

As the manner for deleting an object from the storage unit 202, a manner of simply erasing the positional information regarding the object concerned to reduce the total number of the objects may be used, or it is possible to classify the deleted object as an object of "a third type" and express "the deletion" by changing the type of the object.

On the other hand, there is none (step S314; No), it is checked whether there is still any object of the second type left (step S316). If there is any left (step S316; Yes), the deleting unit 207 deletes the object of the second type that is displayed closest to the sight from the storage unit 202 (step S317), and goes to step S319.

On the other hand, there is no object of the second type left (step S316; No), the deleting unit 207 deletes the one of the objects of the first type displayed upon the sight, that is closest to the position of the ego character from the storage unit 202 (step S318), and goes to step S319.

In this manner, the CPU 101 functions as the deleting unit 207 in cooperation with the RAM 103, etc. According to the present embodiment, which object is to delete is decided according to a procedure as described above. However, this condition may be arbitrarily changed.

On the other hand, in a case where the attack ends in a failure (step S313; No), the flow goes to step S319. Note that the flow may proceed to step S320 not to step S319, so that any process associated with the instruction input concerned may be performed. As the processes at step S320, changes of various designations for the configuration, displacement of the ego character, changes of the direction of the sight (the direction of the flame thrower), etc. may be adopted.

Then, the positions of the objects are updated based on a random number or the like (step S319), and the flow returns to step S309. Here, the winning conditions, etc. of the game may be evaluated to terminate the present process in an appropriate manner.

Meanwhile, in a case where the sound output is completed (step S309; Yes), the flow returns to step S301.

As described above, according to the present embodiment, by outputting sounds that match with the number and movements of a plurality of objects disposed in a virtual space in an easy manner, it is possible to give live feelings while reducing the amount of calculations necessary for this process as much as possible, and to enable the player to know the number of objects from the increase or decrease of the sound volume of the basic sound information, thereby making it possible to reduce the amount of calculations necessary and give the player live feelings.

Embodiment 2

According to the above-described embodiment, if the object overlaid upon the sight is of the second type, this object is deleted, and if not, the closest one among the objects of the second type, if there is any left, is deleted, while an object of the first type is deleted if there are only objects of the first type left.

According to the present embodiment, the objects to be deleted in the above-described embodiment will be changed as follows.

First, if the objects that are overlaid on the sight include ones that are of the second type, any of these is deleted, as has been in the above-described embodiment.

Next, if the objects that are overlaid on the sight are of the first type only, whether there is any object of the second type left is checked, and if there is none left, any of the objects of the first type that are overlaid on the sight is deleted, as likewise has been so in the above-described embodiment.

Hence, what should be considered is a case that the objects that are overlaid on the sight are of the first type only, and there are objects of the second type left.

In this case, the object of the second type that is displayed closest to the sight is spotted. This will be called "object A".

Further, among the objects of the first type that are overlaid on the sight, the one that is positioned closest to the object A in the virtual space is spotted. This will be called "object B".

Then, the object B is deleted from the storage unit 202, and the type of the object A is updated to the first type. This is like exchanging the types of the object A and object B in order to delete the object B of the second type.

According to the present embodiment, while giving a natural impression to the player by extinguishing an object that is closer to the sight, it is possible to give an impression that the objects are moving to the player in a natural manner, by doing the most not to reduce the number of the objects of the first type.

The present application claims priority based on Japanese Patent Application No 2004-275720, the content of which is incorporated herein in its entirety.

INDUSTRIAL APPLICABILITY

As explained above, according to the present invention, it is possible to provide a game machine and a game machine control method which are suitable for outputting sounds generated by multiple objects placed in a virtual space in as easy a manner as possible while giving live feelings, a program for realizing these on a computer, and a computer-readable information recording medium storing the program, and to apply these to game machine techniques such as a shooting game, etc., and to virtual reality techniques for providing virtual experiences of various types.

The invention claimed is:

1. A game machine, comprising:
a storage unit which stores objects of a first type and objects of a second type, each of the objects being capable of moving in a virtual space, and having an each position in the virtual space, the first and second types defining similar objects;
a basic sound acquiring unit which acquires basic sound information, which functions as a basic environmental sound, such that a volume associated with the basic environmental sound increases as a total number of the objects of the first type and the second type which are stored in said storage unit increases;
an imitation sound acquiring unit which acquires imitation sound information, which imitates positional sounds generated by the objects of the first type stored in said storage unit as a function of the each position in the virtual space of each object of the first type, such that each of the positional sounds is coming from each of the objects of the first type;
a mixing output unit which mixes and outputs the acquired basic sound information and the acquired imitation sound information;
an input receiving unit which receives an instruction input from a user; and
a deleting unit which, in a case where the received instruction input satisfies a predetermined extinction condition, deletes at least one of the objects of the second type from said storage unit if there is any object of the second type stored in said storage unit and deletes at least one of the objects of the first type from said storage unit if there is no object of the second type stored in said storage unit.

2. The game machine according to claim 1,
wherein said basic sound acquiring unit acquires the basic sound information in a manner that a sound volume of the basic sound information monotonically non-decreases when the total number of the objects of the first type and the second type stored in said storage unit increases, and the sound volume monotonically non-increases when the total number decreases.

3. The game machine according to claim 1, further comprising
a display unit which displays states of the objects of the first type and the second type stored in said storage unit, and a sight which moves in the virtual space in accordance with the received instruction input,
wherein in deleting any of the objects of the first type, said deleting unit deletes an object of the first type that is displayed closest to the sight, and in deleting any of the objects of the second type, said deleting unit deletes an object of the second type that is displayed closest to the sight.

4. The game machine according to claim 3,
wherein in deleting any of the objects of the second type, in a case where
(a) there is an object A of the second type, which is displayed closest to the sight among the objects of the second type, and
(b) there is an object B of the first type, object B, which is displayed closer to the sight than the object A is, and which is positioned closest to the object A among the objects of the first type in virtual space, said deleting unit deletes the object B from said storage unit instead of deleting the object A, and updates the storage unit such that the type of the object A is to be the first type.

5. A game machine control method for controlling a game machine comprising a storage unit, a basic sound acquiring unit, an imitation sound acquiring unit, a mixing output unit, an input receiving unit, and a deleting unit, said storage unit storing objects of a first type and objects of a second type, each of the objects being capable of moving in a virtual space, and having an each position in the virtual space, the first and second types defining similar objects, said method comprising:
a basic sound acquiring step, at which said basic sound acquiring unit acquires basic sound information, which functions as a basic environmental sound, such that a volume associated with the basic environmental sound increases as a total number of the objects of the first type and the second type, which are stored in said storage unit increases;
an imitation sound acquiring step, at which said imitation sound acquiring unit acquires imitation sound information, which imitates positional sounds generated by the objects of the first type stored in said storage unit as a function of the each position in the virtual space of each object of the first type, such that each of the positional sounds is coming from each of the objects of the first type;
a mixing outputting step, at which said mixing output unit mixes and outputs the acquired basic sound information and the acquired imitation sound information;
an input receiving step, at which said input receiving unit receives an instruction input from a user; and
a deleting step, at which in a case where the received instruction input satisfies a predetermined extinction condition, said deleting unit deletes at least one of the objects of the second type from said storage unit if there is any object of the second type stored in said storage unit and said deleting unit deletes at least one of the objects of the first type from said storage unit if there is no object of the second type stored in said storage unit.

6. A non-transitory computer-readable information recording medium storing a program for controlling a computer to function as:
a storage unit which stores objects of a first type and objects of a second type, each of the objects being capable of moving in a virtual space, and having an each position in the virtual space, the first and second types defining similar objects;
a basic sound acquiring unit which acquires basic sound information, which functions as a basic environmental sound, such that a volume associated with the basic environmental sound increases as a total number of the objects of the first type and the second type which are stored in said storage unit increases;
an imitation sound acquiring unit which acquires imitation sound information, which imitates positional sounds generated by the objects of the first type stored in said storage unit as a function of the each position in the virtual space of each object of the first type, such that each of the positional sounds is coming from each of the objects of the first type;
a mixing output unit which mixes and outputs the acquired basic sound information and the acquired imitation sound information;
an input receiving unit which receives an instruction input from a user; and a deleting unit which, in a case where the received instruction input satisfies a predetermined extinction condition, deletes at least one of the objects of the second type from said storage unit if there is any object of the second type stored in said storage unit and deletes at least one of the objects of the first type from said storage unit if there is no object of the second type stored in said storage unit.

7. A program stored in a non-transitory computer-readable information recording medium for controlling a computer to function as:

a storage unit which stores objects of a first type and of a second type, each of the objects being capable of moving in a virtual space, and having an each position in the virtual space, the first and second types defining similar objects;

a basic sound acquiring unit which acquires basic sound information, which functions as a basic environmental sound, such that a volume associated with the basic environmental sound increases as a total number of the objects of the first type and the second type which are stored in said storage unit increases;

an imitation sound acquiring unit which acquires imitation sound information, which imitates positional sounds generated by the objects of the first type stored in said storage unit as a function of the each position in the virtual space of each object of the first type, such that each of the positional sounds is coming from each of the objects of the first type;

a mixing output unit which mixes and outputs the acquired basic sound information and the acquired imitation sound information;

an input receiving unit which receives an instruction input from a user; and a deleting unit which, in a case where the received instruction input satisfies a predetermined extinction condition, deletes at least one of the objects of the second type from said storage unit if there is any object of the second type stored in said storage unit and deletes at least one of the objects of the first type from said storage unit if there is no object of the second type stored in said storage unit.

* * * * *